United States Patent
Hirabayashi et al.

(10) Patent No.: US 10,814,694 B2
(45) Date of Patent: Oct. 27, 2020

(54) HYBRID VEHICLE

(71) Applicant: TOYOTA JIDOSHA KABUSHIKI KAISHA, Toyota-shi, Aichi-ken (JP)

(72) Inventors: Hidekazu Hirabayashi, Chiryu (JP); Kunihiko Jinno, Toyota (JP); Hiroaki Matsumoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1109 days.

(21) Appl. No.: 14/490,299

(22) Filed: Sep. 18, 2014

(65) Prior Publication Data
US 2015/0102118 A1  Apr. 16, 2015

(30) Foreign Application Priority Data
Oct. 16, 2013  (JP) ................. 2013-215276

(51) Int. Cl.
*B60H 1/03* (2006.01)
*B60H 1/00* (2006.01)
*B60H 1/32* (2006.01)

(52) U.S. Cl.
CPC ......... *B60H 1/004* (2013.01); *B60H 1/00921* (2013.01); *B60H 1/3208* (2013.01); *B60H 1/3213* (2013.01); *B60H 2001/3292* (2013.01)

(58) Field of Classification Search
CPC .................................. B60H 1/03; B60H 1/22
USPC ..................................... 237/12.3 R
See application file for complete search history.

(56) References Cited

U.S. PATENT DOCUMENTS

| 5,497,941 A | 3/1996 | Numazawa et al. |
| 2009/0020620 A1* | 1/2009 | Douarre ............. B60H 1/00278 237/12.3 R |
| 2010/0012295 A1 | 1/2010 | Nemesh et al. |
| 2010/0155018 A1* | 6/2010 | Goenka ............. B60H 1/00278 165/59 |
| 2013/0192271 A1* | 8/2013 | Barnhart ................. F25B 21/04 62/3.3 |
| 2013/0226379 A1* | 8/2013 | Hirai ..................... B60K 6/445 701/22 |
| 2013/0298571 A1* | 11/2013 | Morimoto ................. B60H 1/32 62/3.1 |
| 2014/0110489 A1* | 4/2014 | Yasui ................... F02N 11/0833 237/5 |
| 2015/0115048 A1* | 4/2015 | Brodie ............... B60H 1/00764 237/2 B |

(Continued)

FOREIGN PATENT DOCUMENTS

| CN | 101633306 A | 1/2010 |
| JP | H05-221233 A | 8/1993 |

(Continued)

*Primary Examiner* — Steven B McAllister
*Assistant Examiner* — John E Bargero
(74) *Attorney, Agent, or Firm* — Oliff PLC

(57) ABSTRACT

When an A/C switch is ON and a predetermined dehumidification condition is met, an ECU determines whether or not HV travel is selected. When the HV travel is selected, the ECU controls an air conditioning facility so that a heat pump cycle performs a cooling operation (dehumidification) and hot-water heating is used for the heating capability. When the EV travel is selected, the ECU controls the air conditioning facility so that the heat pump cycle performs dehumidification heating.

2 Claims, 15 Drawing Sheets

(56) References Cited

U.S. PATENT DOCUMENTS

| | | | |
|---|---|---|---|
| 2015/0210141 A1* | 7/2015 | Ragazzi | B60H 1/00907 |
| | | | 62/93 |
| 2016/0075212 A1* | 3/2016 | Morishita | F25B 41/04 |
| | | | 165/202 |
| 2016/0159199 A1* | 6/2016 | Kuroda | F25B 5/04 |
| | | | 165/202 |
| 2017/0158022 A1* | 6/2017 | Kim | B60H 1/00921 |

FOREIGN PATENT DOCUMENTS

| | | |
|---|---|---|
| JP | A-6-255349 | 9/1994 |
| JP | H11-170848 A | 6/1999 |
| JP | 3119281 B2 | 12/2000 |
| JP | 2008-296646 A | 12/2008 |
| JP | 4893475 B2 | 3/2012 |
| JP | 2013-154805 A | 8/2013 |

\* cited by examiner (SERIES DEHUMIDIFICATION HEATING OPERATION)

<DEHUMIDIFICATION HEATING OPERATION>

HYBRID VEHICLE

This nonprovisional application is based on Japanese Patent Application No. 2013-215276 filed on Oct. 16, 2013 with the Japan Patent Office, the entire contents of which are hereby incorporated by reference.

BACKGROUND OF THE INVENTION

Field of the Invention

The present invention relates to a hybrid vehicle, and particularly relates to a control technique for an air conditioning facility mounted on a hybrid vehicle.

Description of the Background Art

Japanese Patent Laying-Open No. 6-255349 discloses a heat-pump-based air conditioning apparatus for a vehicle. This air conditioning apparatus includes a heat pump cycle having an electric compressor which compresses a refrigerant using electric power. This air conditioning apparatus uses an indoor heat exchanger to cool and dehumidify air to be blown, and uses an electric heater disposed downstream of the indoor heat exchanger to heat the cooled and dehumidified air to be blown, to thereby enable dehumidification and heating (see Japanese Patent Laying-Open No. 6-255349).

The heat-pump-based air conditioning apparatus disclosed in Japanese Patent Laying-Open No. 6-255349 uses electric power for both dehumidification of the air to be blown and heating of the dehumidified air, which results in large power consumption.

A hybrid vehicle provided with an engine, a motor, and a battery supplying electric power to the motor is capable of heating by means of the engine as a heat source (hot-water heating by means of an engine coolant). The above-referenced Japanese Patent Laying-Open No. 6-255349 does not take this into consideration and thus still has a room for improvement in control of dehumidification heating.

SUMMARY OF THE INVENTION

An object of the present invention is therefore to provide a hybrid vehicle capable of executing dehumidification heating control appropriate for the hybrid vehicle.

According to the present invention, a hybrid vehicle includes an internal combustion engine, a power storage device, an electric motor, a control apparatus, and an air conditioning facility. The power storage device stores electric power generated using an output of the internal combustion engine. The electric motor generates a vehicle drive force using the electric power stored in the power storage device. The control apparatus controls travel of the vehicle by selectively applying EV travel for causing the vehicle to travel by the electric motor while stopping the internal combustion engine and HV travel for causing the vehicle to travel by operating the internal combustion engine. The air conditioning facility is capable of heating while dehumidifying a vehicle interior. The air conditioning facility is configured to be capable of selectively performing a first dehumidification heating and a second dehumidification heating. The first dehumidification heating is performed for conducting dehumidification and heating using the electric power stored in the power storage device. The second dehumidification heating is performed for conducting heating using the internal combustion engine as a heat source while conducting dehumidification using the electric power stored in the power storage device. The control apparatus further performs control of the air conditioning facility so that the air conditioning facility more preferentially performs the second dehumidification heating during the HV travel than during the EV travel.

The second dehumidification heating where heating is performed using the internal combustion engine as a heat source is smaller in power consumption than the first dehumidification heating where dehumidification and heating are done using electric power. In this hybrid vehicle, the second dehumidification heating is more preferentially performed during the HV travel where the vehicle is caused to travel by operating the internal combustion engine, than during the EV travel. Therefore, as compared with the case where the first dehumidification heating is used all the time regardless of whether the vehicle performs the HV travel or the EV travel, the power consumption can be reduced. In contrast, during the EV travel where the vehicle is caused to travel by the electric motor while the internal combustion engine is stopped, the first dehumidification heating ensures the heating capacity without operating the internal combustion engine. Thus, the hybrid vehicle is capable of executing dehumidification heating control appropriate for the hybrid vehicle.

Preferably, in a case where the internal combustion engine or a coolant for the internal combustion engine has a temperature lower than a criterion value, the control apparatus fails to perform, even during the HV travel, the control of the air conditioning facility so that the air conditioning facility more preferentially performs the second dehumidification heating during the HV travel than during the EV travel.

Even during the HV travel, the temperature of the internal combustion engine or the coolant may be low immediately after the EV travel is switched to the HV travel. If the second dehumidification heating is more preferentially performed in this condition, the heating capacity of the air conditioning facility is disadvantageously reduced. In this hybrid vehicle, the second dehumidification heating is not more preferentially performed, even during the HV travel, in the case where the temperature of the internal combustion engine or the coolant is low. Therefore, reduction of the heating capacity of the air conditioning facility can be prevented.

Further, according to the present invention, a hybrid vehicle includes an internal combustion engine, a power storage device, an electric motor, a control apparatus, and an air conditioning facility. The power storage device stores electric power generated using an output of the internal combustion engine. The electric motor generates a vehicle drive force using the electric power stored in the power storage device. The control apparatus controls travel of the vehicle by selectively applying a CD (Charge Depleting) mode for consuming an SOC of the power storage device and a CS (Charge Sustaining) mode for sustaining the SOC. The air conditioning facility is capable of heating while dehumidifying a vehicle interior. The air conditioning facility is configured to be capable of selectively performing a first dehumidification heating and a second dehumidification heating. The first dehumidification heating is performed for conducting dehumidification and heating using the electric power stored in the power storage device. The second dehumidification heating is performed for conducting heating using the internal combustion engine as a heat source while conducting dehumidification using the electric power stored in the power storage device. The control apparatus further performs control of the air conditioning facility so that the air conditioning facility more preferentially performs the second dehumidification heating during the CS mode than during the CD mode.

In the CS mode where the SOC of the power storage device is sustained, the internal combustion engine is repeatedly started/stopped for the purpose of sustaining the SOC and thus the internal combustion engine has been warmed up. In view of this, this hybrid vehicle more preferentially performs the second dehumidification heating in the CS mode than in the CD mode where the SOC is consumed. Accordingly, as compared with the case where the first dehumidification heating is applied all the time regardless of whether the mode is the CS mode or the CD mode, the power consumption can be reduced. In contrast, in the CD mode, the first dehumidification heating can ensure the heating capacity without operating the internal combustion engine. Thus, the hybrid vehicle can execute dehumidification heating control appropriate for the hybrid vehicle.

Preferably, the control apparatus is further capable of controlling travel of the vehicle by applying an ECO mode for reducing a frequency of starting the internal combustion engine. The control apparatus controls the air conditioning facility so that the air conditioning facility performs the first dehumidification heating when the CD mode is selected and the ECO mode is selected. The control apparatus also controls the air conditioning facility so that the air conditioning facility performs the second dehumidification heating when the CD mode is selected and the ECO mode is not selected.

In this hybrid vehicle, the first dehumidification heating is performed when the ECO mode is selected in the CD mode. While the power consumption of the air conditioning facility is accordingly increased, the ECO mode can be executed while avoiding start of the internal combustion engine due to insufficient heating capacity. In contrast, when the ECO mode is not selected in the CD mode, the second dehumidification heating is performed, and therefore, the power consumption is reduced and an adequate travel distance in the CD mode can be ensured.

Preferably, the air conditioning facility includes a heat pump cycle and a hot-water heating apparatus. The heat pump cycle has an electric compressor, an indoor condenser, a first expansion valve, an outdoor heat exchanger, a second expansion valve, and an evaporator. The hot-water heating apparatus heats a vehicle interior using the internal combustion engine as a heat source and using a coolant for the internal combustion engine. The first dehumidification heating is performed by conducting heating using the indoor condenser while conducting dehumidification using the evaporator. The second dehumidification heating is performed by conducting heating using the hot-water heating apparatus while conducting dehumidification using the evaporator.

The second dehumidification heating performs heating by means of the hot-water heating apparatus and thus consumes less electric power than the first dehumidification heating performing heating by means of the indoor condenser. In this hybrid vehicle, the second dehumidification heating is more preferentially performed during the HV travel (or the CS mode) than during the EV travel (or the CD mode), and therefore, the power consumption can be reduced as compared with the case where the first dehumidification heating is applied all the time regardless of whether it is the HV travel or the EV travel or whether it is the CS mode or the CD mode. In contrast, during the EV travel (or the CD mode), the first dehumidification heating can ensure the heating capacity without operating the internal combustion engine.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
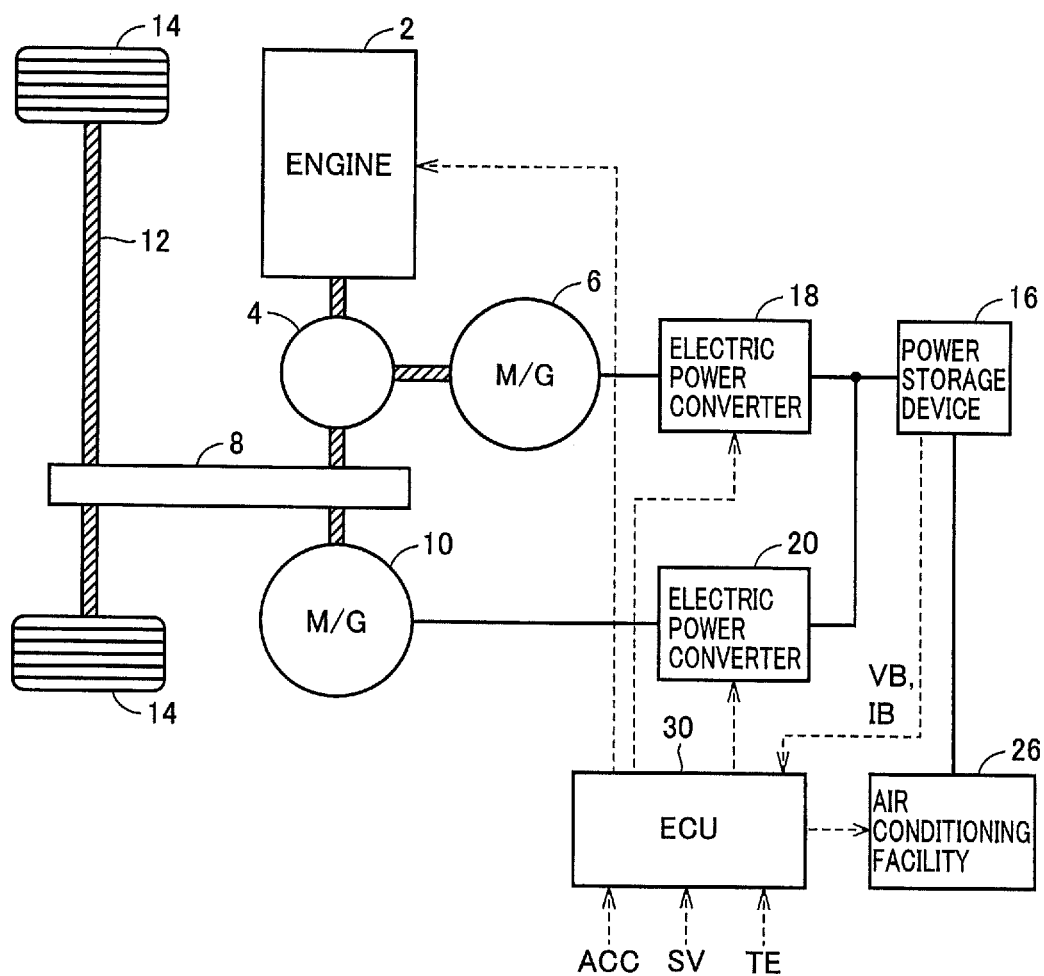
FIG. 1 is an overall block diagram of a hybrid vehicle according to an embodiment of the present invention.

In the following, embodiments of the present invention will be described in detail with reference to the drawings. In the drawings, the same or corresponding parts are denoted by the same reference characters, and a description thereof will not be repeated.

First Embodiment

Overall Configuration of Hybrid Vehicle

FIG. 1 is an overall block diagram of a hybrid vehicle according to a first embodiment of the present invention. Referring to FIG. 1, hybrid vehicle 1 includes an engine 2, a power split device 4, motor generators 6, 10, a transmission gear 8, a driveshaft 12, and wheels 14. Hybrid vehicle 1 further includes a power storage device 16, electric power converters 18, 20, an air conditioning facility 26, and an electronic control apparatus (hereinafter referred to as "ECU (Electronic Control Unit)") 30.

Hybrid vehicle 1 is capable of travelling using a drive force which is output from at least one of engine 2 and motor generator 10. Power split device 4 is configured to be capable of splitting the drive force generated by engine 2 into a drive force for driving driveshaft 12 and a drive force for driving motor generator 6. Power split device 4 is formed of a planetary gear train, for example.

Engine 2 is incorporated in hybrid vehicle 1 to serve as a motive power source for driving transmission gear 8 which transmits the motive power to driveshaft 12 and also driving motor generator 6. Motor generator 6 is incorporated in hybrid vehicle 1 to operate as an electric generator driven by engine 2 and also operate as an electric motor capable of starting engine 2. Motor generator 10 is incorporated in hybrid vehicle to serve as a motive power source driving transmission gear 8 which transmits the motive power to driveshaft 12.

Power storage device 16 is a rechargeable DC power supply and formed of a secondary battery such as nickel-metal hydride or lithium ion battery, or a large-capacitance capacitor, for example. Power storage device 16 supplies electric power to electric power converters 18, 20. Further, when motor generator 6 and/or motor generator 10 generates electric power, power storage device 16 receives the generated electric power to be charged therewith. Power storage device 16 also supplies electric power to air conditioning facility 26 which performs air conditioning of a vehicle interior. It should be noted that power storage device 16 uses a voltage sensor and a current sensor, which are not shown, to detect voltage VB and current IB of power storage device 16, and outputs the detected values to ECU 30.

Electric power converter 18 converts electric power generated by motor generator 6 into DC power and outputs the DC power to power storage device 16. Electric power converter 20 converts DC power supplied from power storage device 16 into AC power and outputs the AC power to motor generator 10. When engine 2 is to be started, electric power converter 18 converts DC power supplied from power storage device 16 into AC power and outputs the AC power to motor generator 6. When the vehicle is braked or reduced in acceleration on a downhill, electric power converter 20 converts electric power generated by motor generator 10 into DC power and outputs the DC power to power storage device 16. Electric power converters 18, 20 are each formed of an inverter, for example. Between power storage device 16 and electric power converters 18, 20, a converter may be provided that boosts an input voltage to electric power converters 18, 20 to a voltage or higher of power storage device 16.

Motor generators 6, 10 are each an AC motor and formed for example of a three-phase AC synchronous motor having a rotor in which permanent magnets are embedded. Motor generator 6 converts kinetic energy generated by engine 2 into electrical energy and outputs the electrical energy to electric power converter 18. Motor generator 6 also generates a drive force from three-phase AC power received from electric power converter 18 and accordingly starts engine 2.

Motor generator 10 generates a drive torque for the vehicle from three-phase AC power received from electric power converter 20. When the vehicle is braked or reduced in acceleration on a downhill, motor generator 10 converts mechanical energy, which has been stored in the vehicle in the form of kinetic energy or potential energy, into electrical energy and outputs the electrical energy to electric power converter 20.

Engine 2 converts thermal energy generated from combustion of a fuel into kinetic energy of a moving body such as piston or rotor, and outputs the resultant kinetic energy to power split device 4. In the case where the moving body is a piston and its movement is a reciprocating movement, the reciprocating movement is converted through a so-called crank mechanism into a rotational movement and the kinetic energy of the piston is transmitted to power split device 4.

Air conditioning facility 26 is a facility for performing air conditioning of the vehicle interior of hybrid vehicle 1, and capable of heating while dehumidifying at least the vehicle interior. Air conditioning facility 26 includes a heat pump cycle which operates with electric power supplied from power storage device 16. Air conditioning facility 26 also includes a hot-water heating apparatus performing heating using engine 2 as a heat source and using a coolant for engine 2. The heat pump cycle does not require engine 2 to operate, but consumes electric power while operating. In contrast, the hot-water heating apparatus does not consume electric power but requires the coolant to be warmed by engine 2. A configuration of air conditioning facility 26 will be described in detail later herein.

ECU 30 includes a CPU (Central Processing Unit), a memory, an input/output buffer, and the like (which are not shown), and performs control of each unit in hybrid vehicle 1. This control is not limited to processing by software, but can be done through processing by dedicated hardware (electronic circuit).

Description of Air Conditioning Facility 26

Figure 2:
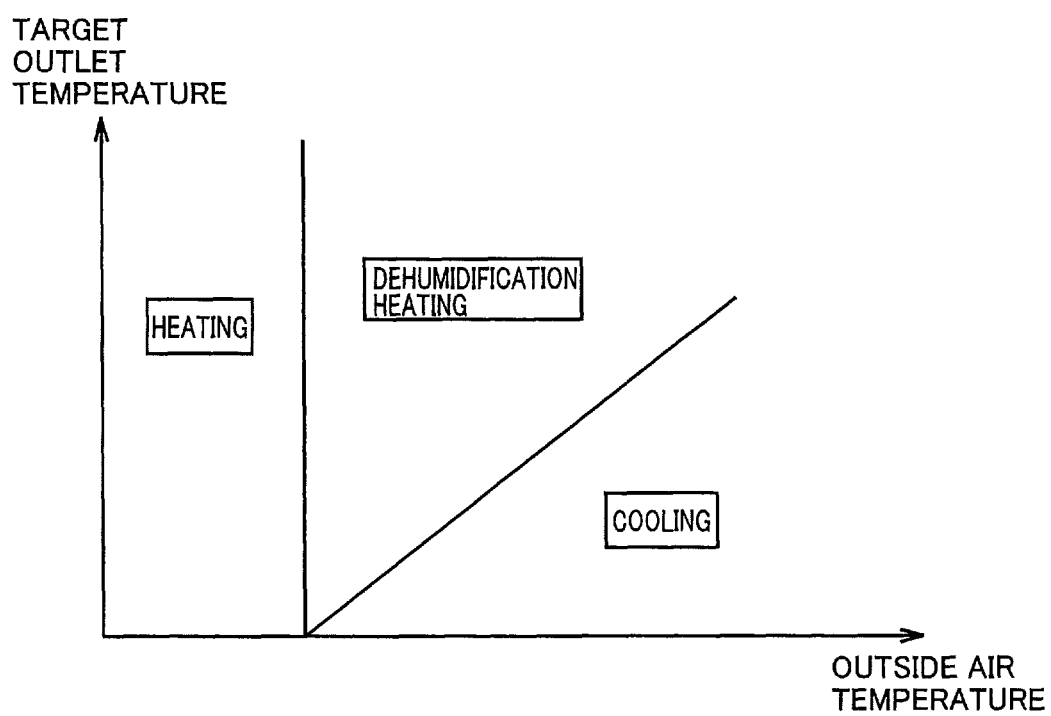
FIG. 2 is a diagram for illustrating air conditioning modes of an air conditioning facility shown in FIG. 1.

FIG. 2 is a diagram for illustrating air conditioning modes of air conditioning facility 26 shown in FIG. 1. Referring to FIG. 2, the horizontal axis represents the temperature of the vehicle exterior air (outside air), and the vertical axis represents the target outlet temperature of air conditioning facility 26. When the outside air temperature is low, air conditioning facility 26 performs a heating operation.

For a temperature region in which the outside air temperature is higher than the region for which the heating operating is performed, air conditioning facility 26 performs a cooling operation when the target outlet temperature is low relative to the outside air temperature, and performs a dehumidification heating operation when the target outlet temperature is high relative to the outside air temperature. During the dehumidification heating operation, the vehicle interior is heated while being dehumidified.

Figure 3:
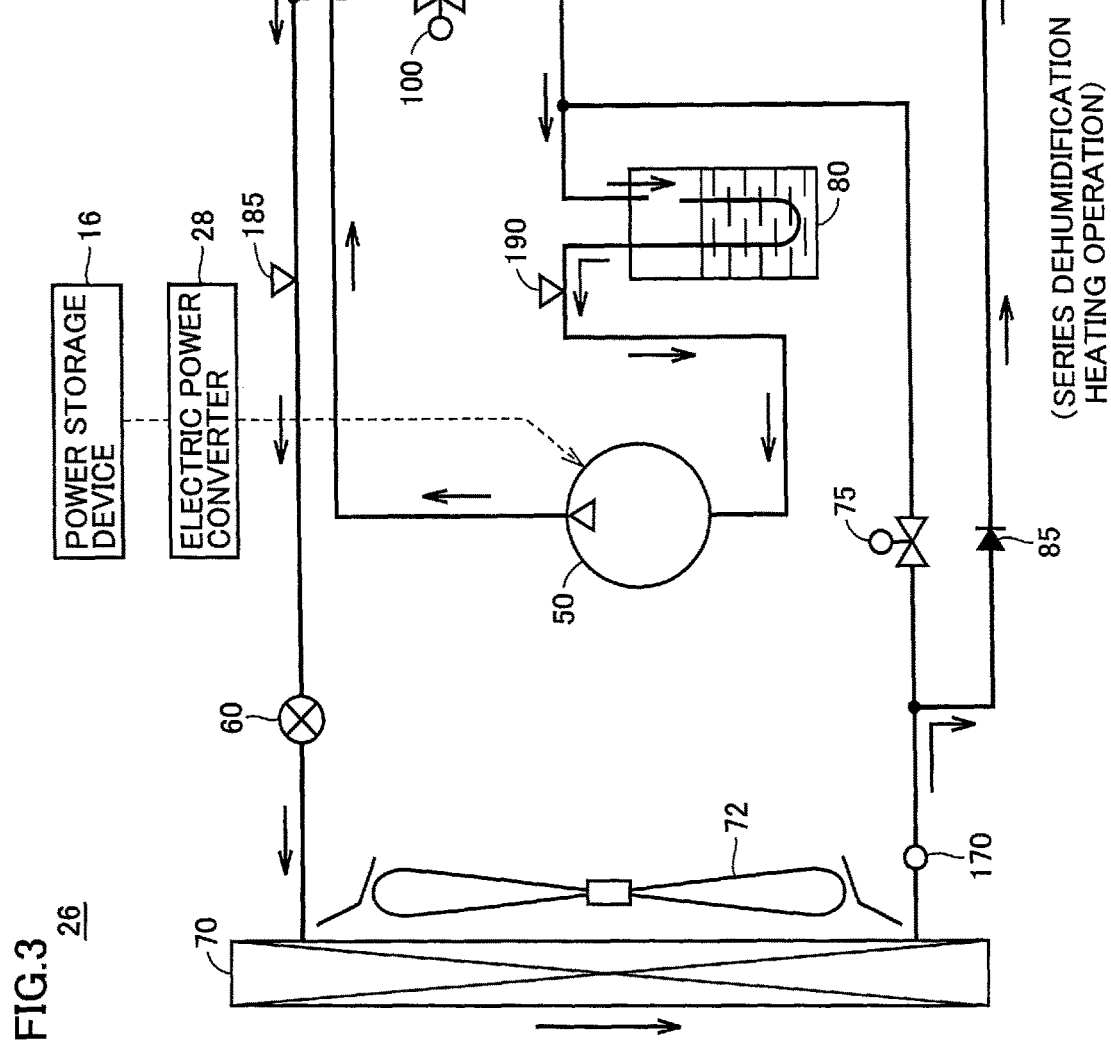
FIG. 3 is a diagram showing a specific configuration of the air conditioning facility shown in FIG. 1.

FIG. 3 is a diagram showing a specific configuration of air conditioning facility 26 shown in FIG. 1. It should be noted that FIG. 3 shows an example configuration of air conditioning facility 26, and the configuration of air conditioning facility 26 is not limited to the configuration shown in FIG. 3. Referring to FIG. 3, air conditioning facility 26 includes the heat pump cycle which operates with electric power supplied from power storage device 16, the hot-water heating apparatus using engine 2 as a heat source, and an indoor air conditioning unit.

The heat pump cycle includes an electric power converter 28, an electric compressor 50, an indoor condenser 55, an expansion valve 60, an outdoor heat exchanger 70, an electromagnetic valve 75, and an accumulator 80. The heat pump cycle also includes a check valve 85, an expansion valve 90, an evaporator 95, and an evaporative pressure regulator valve (EPR) 97. The heat pump cycle further includes temperature sensors 160, 165, 170, 175, 180, and pressure sensors 185, 190.

Electric compressor 50 operates using electric power supplied from power storage device 16. Electric compressor 50 sucks a refrigerant and adiabatically compresses the refrigerant into an over-heated-state refrigerant gas, and discharges the resultant high-temperature and high-pressure gas phase refrigerant. Electric compressor 50 sucks and discharges the refrigerant to thereby allow the refrigerant to circulate through the heat pump cycle.

Electric power converter 28 makes a voltage conversion of electric power supplied from power storage device 16 and outputs it to electric compressor 50. Electric power converter 28 is formed for example of an inverter.

Indoor condenser 55 is connected to the refrigerant output side of electric compressor 50 and disposed in a casing 110 of the indoor air conditioning unit. Indoor condenser 55 makes a heat exchange between the refrigerant flowing through the indoor condenser and the air to be blown which flows in casing 110 to thereby heat the air to be blown.

Expansion valve 60 is disposed on a pipe extending between indoor condenser 55 and outdoor heat exchanger 70, ejects from a small hole the high-pressure liquid-phase refrigerant having passed thorough indoor condenser 55 to thereby expand it, and accordingly decompresses the liquid refrigerant into low temperature and low pressure moist steam in the state of a gas-liquid mixture. Expansion valve 60 is formed for example of an electric expansion valve.

Outdoor heat exchanger 70 is connected to the refrigerant output side of expansion valve 60, and disposed for example behind the front bumper of the vehicle. Outdoor heat exchanger 70 makes a heat exchange between the refrigerant flowing inside the outdoor heat exchanger and the vehicle exterior air (outside air) which is blown from a blower fan 72. When the temperature of the refrigerant is higher than the outside air temperature, the refrigerant passing through outdoor heat exchanger 70 accordingly dissipates heat to the outside air. When the temperature of the refrigerant is lower than the outside air temperature, the refrigerant passing through outdoor heat exchanger 70 accordingly absorbs heat from the outside air.

Electromagnetic valve 75 is configured to be switchable between a fully open state and a fully closed state. During the heating operation (not the dehumidification heating operation), electromagnetic valve 75 is controlled so that it is fully opened. During the dehumidification heating operation, during the cooling operation, and during stoppage of electric compressor 50, electromagnetic valve 75 is controlled so that it is fully closed.

Accumulator 80 is disposed upstream of the flow of the refrigerant, with respect to electric compressor 50. Accumulator 80 separates the liquid phase refrigerant and the gas phase refrigerant from each other, and causes only the gaseous refrigerant to be sucked by electric compressor 50. This is for the reason that if the liquid refrigerant is sucked by electric compressor 50, components of electric compressor 50 such as valve may be damaged due to liquid compression.

Check valve 85 is disposed on a pipe branched from a pipe extending between outdoor heat exchanger 70 and electromagnetic valve 75, and allows the refrigerant which is output from outdoor heat exchanger 70 to flow and inhibits the flow in the opposite direction. Expansion valve 90 is disposed upstream of the flow of the refrigerant to evaporator 95, decompresses and thereby expands the refrigerant having passed through outdoor heat exchanger 70, and outputs it to evaporator 95. Expansion valve 90 is formed for example of an electric expansion valve.

Evaporator 95 is connected to the refrigerant output side of expansion valve 90, and disposed in casing 110 of the indoor air conditioning unit. Evaporator 95 makes a heat exchange between the refrigerant flowing through the evaporator and the air to be blown which flows in casing 110, to thereby cool and also dehumidify the air to be blown. EPR 97 is disposed on a pipe extending between evaporator 95 and accumulator 80, and controls the evaporation pressure of evaporator 95.

Electromagnetic valve 100 is disposed on a bypass pipe disposed between the outlet side pipe of indoor condenser 55 and the inlet side pipe of expansion valve 90. This bypass pipe is controlled so that it is fully opened during a parallel dehumidification heating operation as described later herein, and controlled so that it is fully closed during other operation modes.

The hot-water heating apparatus includes a heater core 105. Heater core 105 is provided on a coolant pipe 107 of engine 2 and disposed in casing 110 of the indoor air conditioning unit. Heater core 105 makes a heat exchange between the engine coolant flowing through the heater core and the air to be blown which flows in casing 110, to thereby heat the air to be blown. Namely, heater core 105 uses engine 2 as a heat source and the hot-water heating apparatus basically uses no electric power. It should be noted that the heating operation by the hot-water heating apparatus and the operation of engine 2 do not necessarily coincide with each other. Namely, even when engine 2 is being stopped, heating by the hot-water heating apparatus is possible as long as engine 2 has previously been operated and accordingly the engine coolant has been warmed.

The indoor air conditioning unit includes casing 110, an air blower 115, an inside-outside air switch door 120, a partition wall 125, and an air mixture door 130. Casing 110 forms a passage for the air to be blown into the vehicle interior. Air blower 115 generates the air to be blown which is to be supplied through the inside of casing 110 into the vehicle interior. Air blower 115 has its number of revolutions (volume of the air) controlled in accordance with the required air volume. Inside-outside air switch door 120 allows one of the vehicle interior air (inside air) and the vehicle exterior air (outside air) or mixes them to be introduced into casing 110.

Evaporator 95 is disposed downstream of the flow of air from air blower 115. Partition wall 125 and air mixture door 130 are disposed downstream of the flow of air from evaporator 95. Partition wall 125 forms a heating air passage 140 and a bypass air passage 145 in casing 110.

In heating air passage 140, heater core 105 and indoor condenser 55 are disposed. The air to be blown which passes through heating air passage 140 is heated by heater core 105 when the engine coolant temperature is higher than the temperature of the air to be blown, and heated by indoor condenser 55 during operation of the heat pump cycle. While the drawing shows heater core 105 disposed upstream of the flow of air from indoor condenser 55, the order in which indoor condenser 55 and heater core 105 are arranged is not particularly limited. Bypass air passage 145 is a passage for directing the air which has passed through evaporator 95 into the vehicle interior without allowing it to pass through indoor condenser 55.

The air to be blown which has passed thorough heating air passage 140 and the air to be blown which has passed thorough bypass air passage 145 are mixed on the downstream side of partition wall 125 and supplied into the vehicle interior. Thus, the temperature of the air to be blown which is to be supplied into the vehicle interior is varied depending on the ratio in air volume between the air passed through heating air passage 140 and the air passed through bypass air passage 145.

Air mixture door 130 is configured to be capable of changing the ratio in air volume between the air to be blown which passes thorough heating air passage 140 and the air to be blown which passes through bypass air passage 145, and changes the ratio in air volume depending on the target temperature.

Description of Heat Pump Cycle

Figure 4:
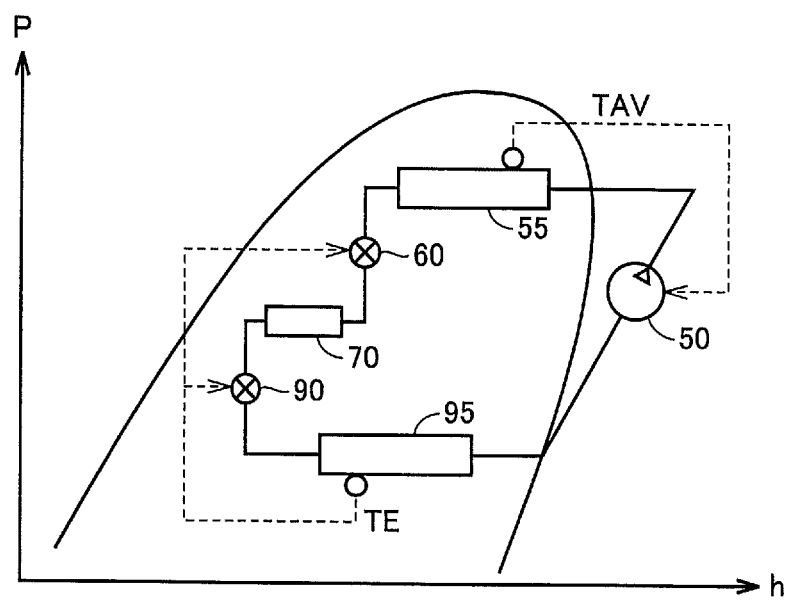
FIG. 4 is a Mollier chart regarding dehumidification heating performed by a heat pump cycle shown in FIG. 3.

FIG. 4 is a Mollier chart regarding the dehumidification heating performed by the heat pump cycle shown in FIG. 3. In FIG. 3, the flow of the refrigerant during the dehumidification heating operation is indicated by arrows. The dehumidification heating operation shown in FIGS. 3 and 4 is also referred to as "series dehumidification heating operation."

Referring to FIGS. 3 and 4, during the series dehumidification heating operation, electromagnetic valves 75 and 100 are closed. Accordingly, the refrigerant flows in the order: electric compressor 50→indoor condenser 55→expansion valve 60→outdoor heat exchanger 70→check valve 85→expansion valve 90→evaporator 95, then flows through accumulator 80 and returns to electric compressor 50. Temperature TAV of indoor condenser 55 is estimated (or detected), and the number of revolutions of electric compressor 50 is controlled in accordance with temperature TAV.

In the indoor air conditioning unit, the air to be blown is dehumidified by evaporator 95, and the dehumidified air to be blown is heated by indoor condenser 55. The extent to which air mixture door 130 is opened is adjusted to thereby regulate the temperature of the air to be blown.

Electromagnetic valves 75, 100 can be opened to thereby enhance the heating capacity when the heat pump cycle performs the dehumidification heating. The dehumidification heating operation for which electromagnetic valves 75, 100 are opened is also referred to as "parallel dehumidification heating operation."

Figure 5:
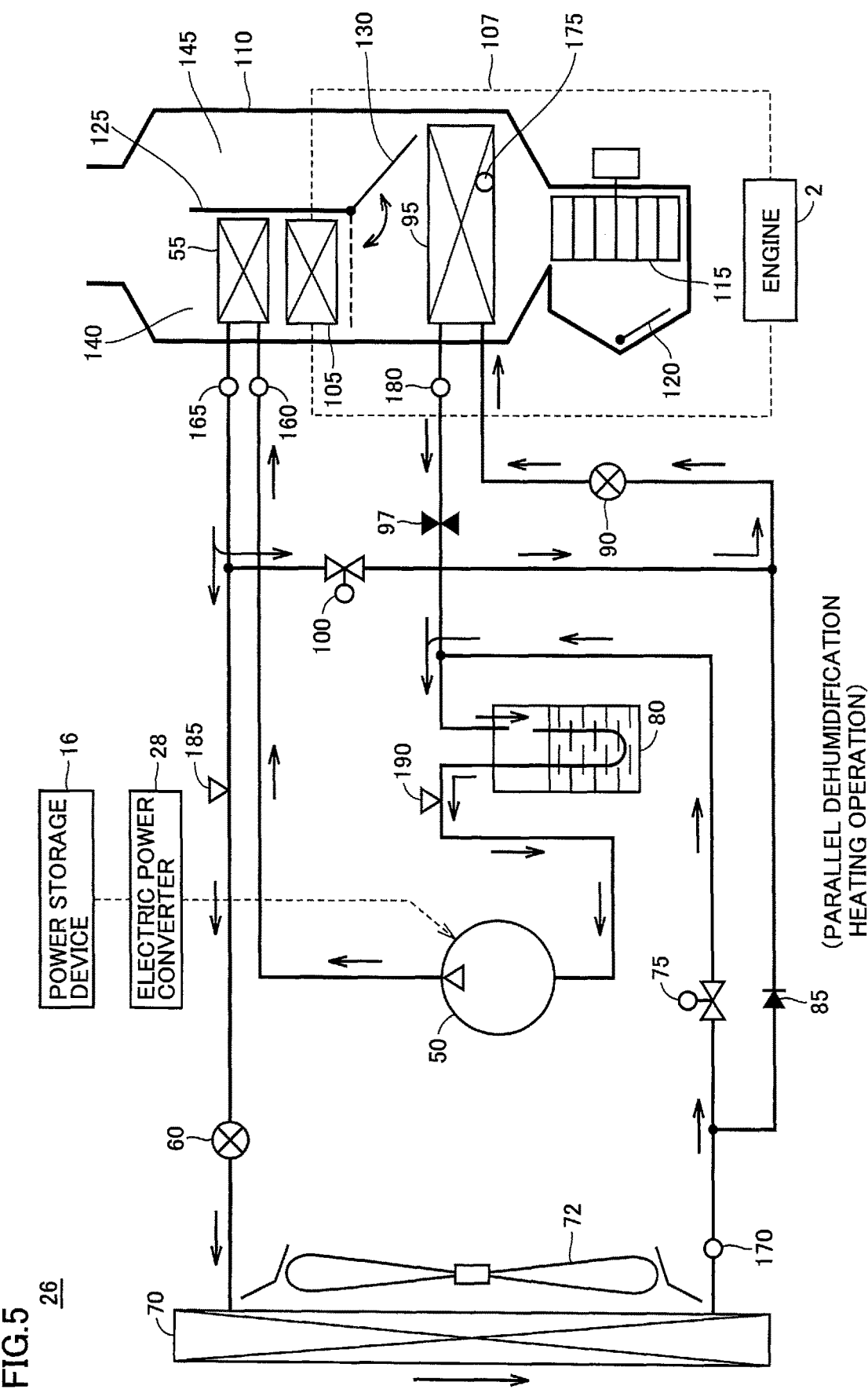
FIG. 5 is a diagram showing a flow of a refrigerant during a parallel dehumidification heating operation.
Figure 6:
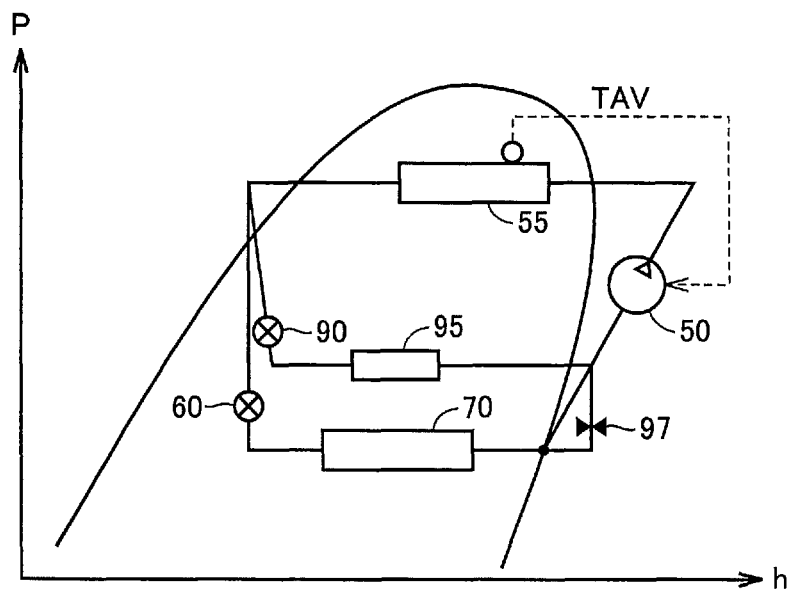
FIG. 6 is a Mollier chart regarding the parallel dehumidification heating operation performed by the heat pump cycle.

FIG. 5 is a diagram showing a flow of the refrigerant during the parallel dehumidification heating operation. FIG. 6 is a Mollier chart regarding the parallel dehumidification heating operation performed by the heat pump cycle. Referring to FIGS. 5 and 6, during the parallel dehumidification heating operation, electromagnetic valves 75, 100 are opened. Accordingly, there are formed a path through which the refrigerant flows in the order: electric compressor 50→indoor condenser 55→expansion valve 60→outdoor heat exchanger 70→electromagnetic valve 75→accumulator 80, and returns to electric compressor 50, and a path thorough which the refrigerant flows in the order: electric compressor 50→indoor condenser 55→electromagnetic valve 100→expansion valve 90→evaporator 95→EPR 97→accumulator 80, and returns to electric compressor 50.

By the parallel dehumidification heating operation, the quantity of heat absorbed by outdoor heat exchanger 70 can be dissipated by indoor condenser 55, and therefore, the parallel dehumidification heating operation is higher in heating capacity than the series dehumidification heating operation. It is not necessarily required that the heat pump cycle is operable for both the series dehumidification heating operation and the parallel dehumidification heating operation, and the heat pump cycle may be operable for only one of the series dehumidification heating operation and the parallel dehumidification heating operation.

Figure 7:
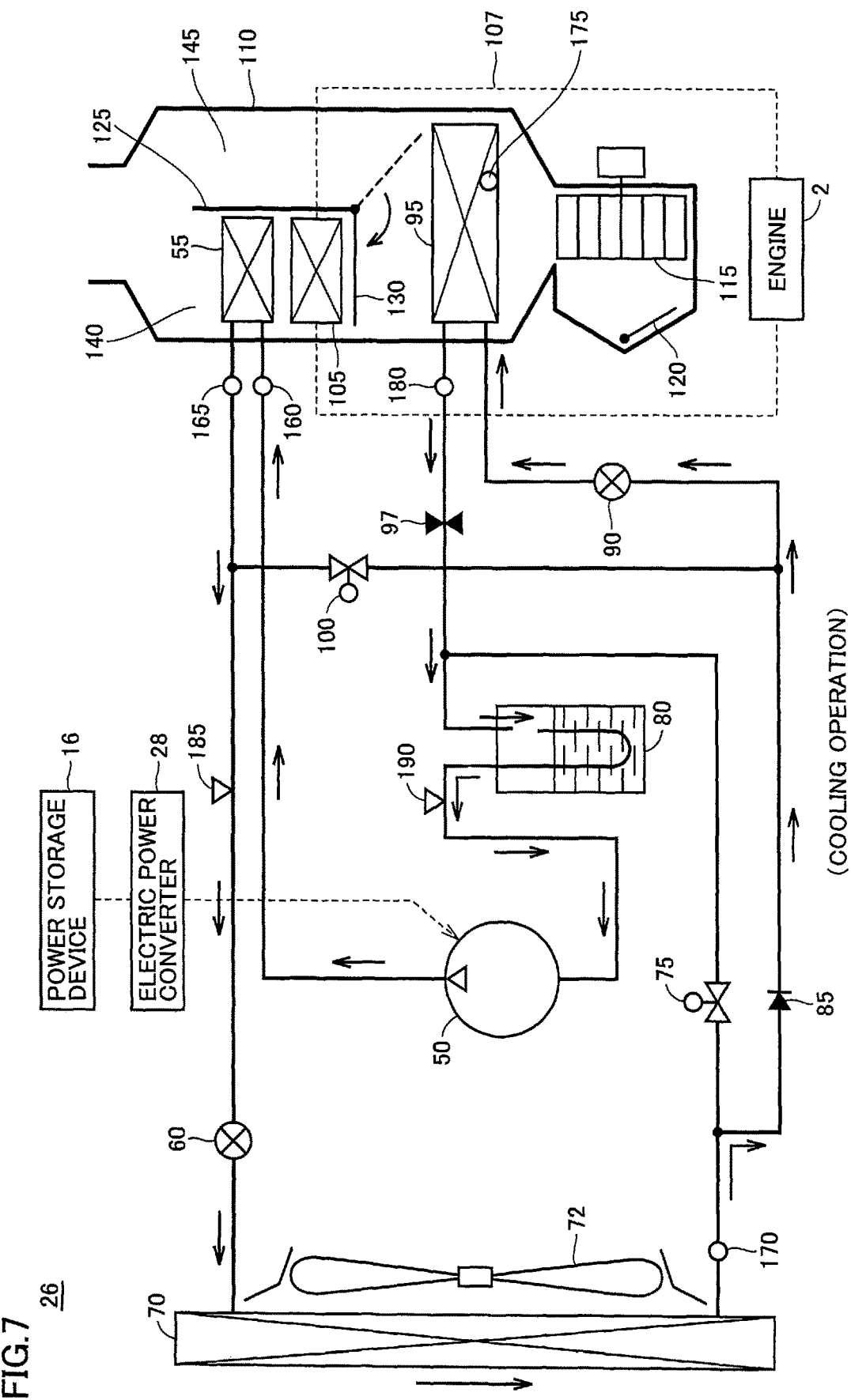
FIG. 7 is a diagram showing a flow of the refrigerant during a cooling operation.
Figure 8:
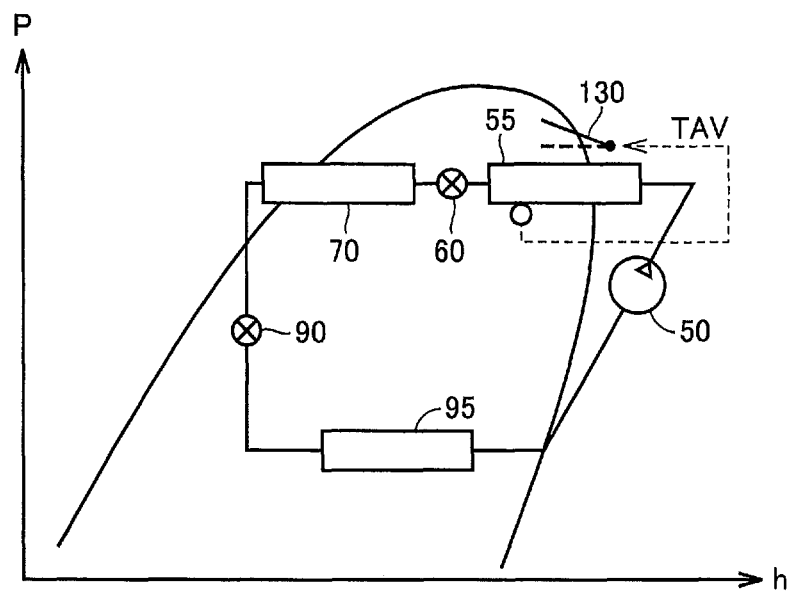
FIG. 8 is a Mollier chart regarding the cooling operation performed by the heat pump cycle.

FIG. 7 is a diagram showing a flow of the refrigerant during the cooling operation. FIG. 8 is a Mollier chart regarding the cooling operation performed by the heat pump cycle. Referring to FIGS. 7 and 8, during the cooling operation, electromagnetic valves 75, 100 are closed. Accordingly, the refrigerant flows in the order: electric compressor 50→indoor condenser 55→expansion valve 60→outdoor heat exchanger 70→check valve 85 expansion valve 90→evaporator 95, and returns through accumulator 80 to electric compressor 50.

During the cooling operation, the flow of the air to be blown which passes through heating air passage 140 in the indoor air conditioning unit is blocked by air mixture door 130. Accordingly, no heat exchange is made by indoor condenser 55 between the refrigerant and the air to be blown, and the air to be blown which has been dehumidified and cooled by evaporator 95 is supplied into the vehicle interior.

Electromagnetic valve 75 may be opened and electromagnetic valve 100 may be closed to thereby allow the refrigerant to flow through indoor condenser 55 and prevent the refrigerant from flowing to evaporator 95, and accordingly enable the heating operation to be performed, which, however, is not shown.

Description of Dehumidification Heating

Regarding the dehumidification heating operation, air conditioning facility 26 is capable of selectively performing a first dehumidification heating and a second dehumidification heating. The first dehumidification heating performs dehumidification and heating of the vehicle interior by causing the heat pump cycle to perform the dehumidification heating operation (series dehumidification heating operation or parallel dehumidification heating operation). Namely, during the first dehumidification heating, electric power stored in power storage device 16 is used to perform dehumidification and heating.

The second dehumidification heating performs dehumidification of the air to be blown by causing the heat pump cycle to perform the cooling operation and performs heating using engine 2 as a heat source. Namely, it is unnecessary for the second dehumidification heating to perform heating by means of the heat pump cycle, and therefore the power consumption of the second dehumidification heating is smaller than that of the first dehumidification heating.

While the first dehumidification heating is larger in power consumption than the second dehumidification heating, the first dehumidification heating uses the heat pump cycle to perform both dehumidification and heating. It is thus unnecessary to use engine 2 as a heat source and engine 2 can be stopped. While the second dehumidification heating is smaller in power consumption than the first dehumidification heating, the second dehumidification heating uses engine 2 as a heat source for heating and thus requires that engine 2 has been warmed up and the coolant for engine 2 has been warmed.

Accordingly, the dehumidification heating operation in the first embodiment is carried out in the following manner. The second dehumidification heating is more preferentially performed during the HV travel for causing the vehicle to travel by operating engine 2, than during the EV travel for causing the vehicle to travel by motor generator 10 while stopping engine 2. In this way, power consumption can be reduced as compared with the case where the dehumidification heating by means of the heat pump cycle (first dehumidification heating) is applied all the time regardless of the travel mode (HV travel/EV travel). During the EV travel, the first dehumidification heating can be applied to ensure the heating capacity without operating engine 2.

Configuration of ECU 30

Figure 9:
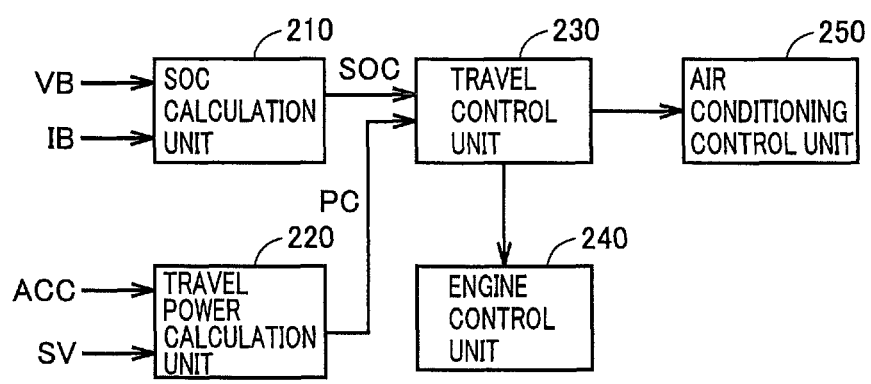
FIG. 9 is a functional block diagram of components, which are involved in air conditioning control, of an ECU shown in FIG. 1.

FIG. 9 is a functional block diagram of components, which are involved in air conditioning control, of ECU 30 shown in FIG. 1. Referring to FIG. 9, ECU 30 includes an SOC calculation unit 210, a travel power calculation unit 220, a travel control unit 230, an engine control unit 240, and an air conditioning control unit 250.

SOC calculation unit 210 calculates the SOC of power storage device 16 based on respective detected values of voltage VB and current IB of power storage device 16. As to how to calculate the SOC, any of a variety of known methods may be used. Travel power calculation unit 220 calculates travel power PC of the vehicle based on accelerator pedal position ACC which depends on the extent to which the accelerator pedal is operated, and vehicle speed SV, for example.

Travel control unit 230 controls travel of hybrid vehicle 1 by selectively applying the EV travel and the HV travel, based on travel power PC and the SOC of power storage device 16. By way of example, travel control unit 230 calculates the required charge/discharge power of power storage device 16 based on the SOC, controls the vehicle so that the vehicle performs the EV travel when the sum of travel power PC and the required charge/discharge power is equal to or less than a predetermined threshold value, and controls the vehicle so that the vehicle performs the HV travel when the aforementioned sum of powers is larger than the threshold value.

Engine control unit 240 controls engine 2 so that engine 2 operates with desired power and a desired number of revolutions when the HV travel is selected by travel control unit 230. In contrast, when the EV travel is selected by travel control unit 230, engine control unit 240 stops engine 2.

Air conditioning control unit 250 controls air conditioning facility 26 when air conditioning of the vehicle interior is requested. By way of example, air conditioning control unit 250 selects an air conditioning mode of air conditioning facility 26 in accordance with a map as shown in FIG. 2, based on the outside air temperature and the target outlet temperature of air conditioning facility 26, and controls air conditioning facility 26 so that air conditioning facility 26 operates in the selected air conditioning mode.

In the case where the dehumidification heating is selected as an air conditioning mode and the EV travel is selected by travel control unit 230, air conditioning control unit 250 controls air conditioning facility 26 so that the heat pump cycle performs the dehumidification heating (first dehumidification heating). Regarding this first dehumidification heating, the series dehumidification heating shown in FIGS. 3 and 4 may be done if the outside air temperature is relatively high, and the parallel dehumidification heating shown in FIGS. 5 and 6 may be done if the outside air temperature is relatively low.

In the case where the dehumidification heating is selected as an air conditioning mode and the HV travel is selected by travel control unit 230, air conditioning control unit 250 controls air conditioning facility 26 so that the heat pump cycle performs the cooling operation (dehumidification) shown in FIGS. 7 and 8 while the hot-water heating using engine 2 as a heat source is done (second dehumidification heating).

Figure 10:
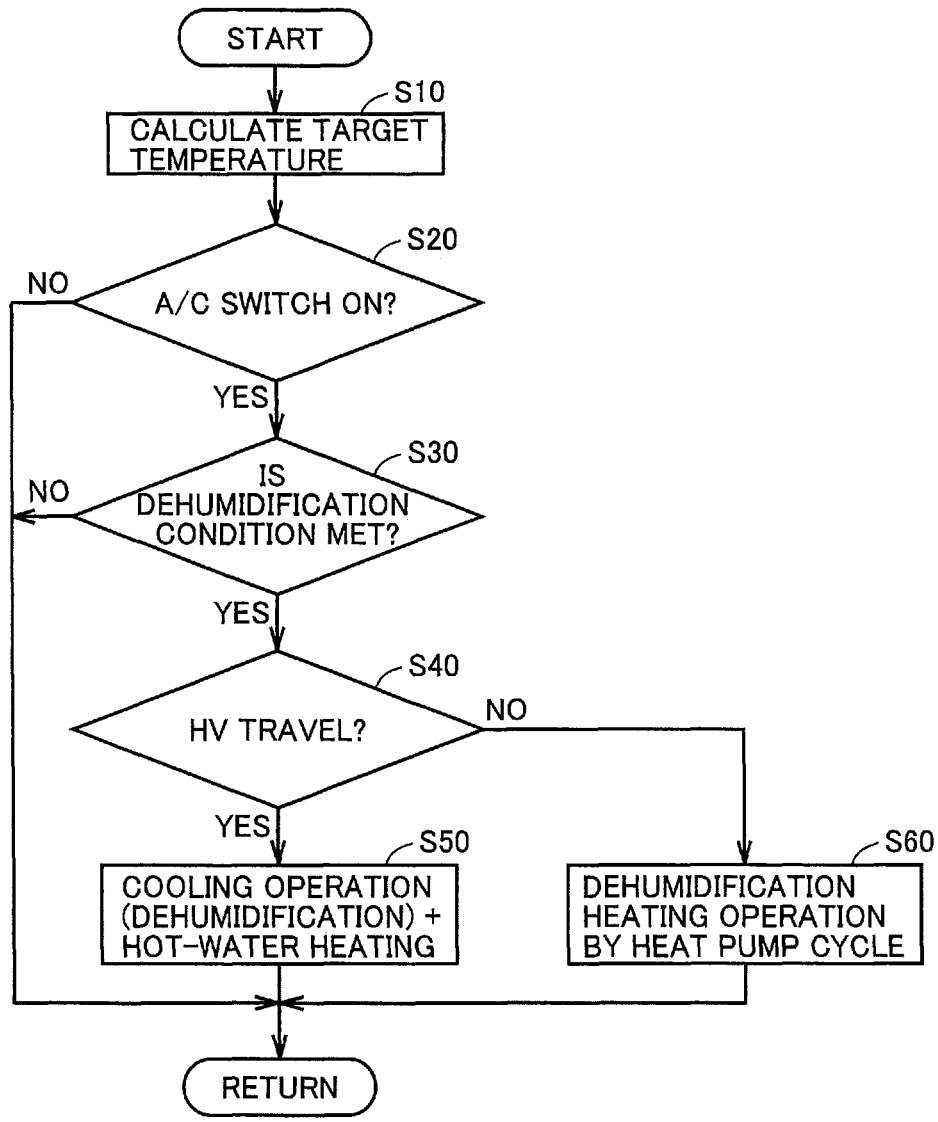
FIG. 10 is a flowchart for illustrating a process procedure of dehumidification heating control executed by the ECU.

FIG. 10 is a flowchart for illustrating a process procedure of the dehumidification heating control executed by ECU 30. This flowchart is implemented through execution at predetermined intervals of a program stored in advance in ECU 30. Alternatively, for a part or the whole of the steps, dedicated hardware (electronic circuit) may be constructed to implement the processing.

Referring to FIG. 10, ECU 30 calculates a target temperature of air conditioning facility 26 (step S10). For example, the target outlet temperature of air conditioning facility 26 is calculated. The target outlet temperature may be calculated based on the set temperature of air conditioning facility 26 and the temperature of the inside air or the outside air. Then, ECU 30 determines whether or not an A/C switch (not shown) is ON (step S20). When the A/C switch is OFF (NO in step S20), ECU 30 will not execute the following series of steps.

When it is determined in step S20 that the A/C switch is ON (YES in step S20), ECU 30 determines whether or not a dehumidification condition is met (step S30). When the outside air temperature is a cryogenic temperature, air conditioning facility 26 is unable to perform the dehumidification operation (cooling operation), and the dehumidification condition is a condition for determining whether or not air conditioning facility 26 can perform the dehumidification operation.

When it is determined in step S30 that the dehumidification condition is met (YES in step S30), ECU 30 determines whether or not hybrid vehicle 1 performs the HV travel (step S40). When it is determined that hybrid vehicle 1 performs the HV travel (YES in step S40), ECU 30 controls air conditioning facility 26 so that the heat pump cycle performs the cooling operation (dehumidification) while the hot-water heating using engine 2 as a heat source is done (step S50). During the HV travel, engine 2 is operated and accordingly the hot-water heating apparatus is operating using engine 2 as a heat source, while the heat pump cycle is operated to perform the cooling operation. Thus, the dehumidification heating (second dehumidification heating) is implemented.

In contrast, when it is determined in step S40 that the vehicle performs the EV travel (NO in step S40), ECU 30 controls air conditioning facility 26 so that the heat pump cycle performs the dehumidification heating (step S60). During the EV travel, engine 2 is stopped. Therefore, the hot-water heating apparatus using engine 2 as a heat source is not used but the dehumidification heating by means of the heat pump cycle (first dehumidification heating) is performed.

As seen from the foregoing, the first embodiment uses the second dehumidification heating during the HV travel where the vehicle is caused to travel by operating engine 2, and can thus reduce the power consumption as compared with the case where the first dehumidification heating is used all the time regardless of whether the vehicle travels by the HV travel or the EV travel. In contrast, during the EV travel where engine 2 is stopped and the vehicle is caused to travel by motor generator 10, the first dehumidification heating is used and therefore the heating capacity can be ensured without operating engine 2. Accordingly, this hybrid vehicle 1 is capable of executing the dehumidification heating control appropriate for the hybrid vehicle.

Modification of the First Embodiment

Even while the HV travel is being performed, the dehumidification heating by means of the heat pump cycle (first dehumidification heating) is done in the case where the engine coolant temperature is low immediately after engine 2 is started, for example. Namely, during the HV travel, the dehumidification heating using the hot-water heating by means of engine 2 as a heat source (second dehumidification heating) is not always applied. Rather, the second dehumidification heating is more preferentially performed during the HV travel than during the EV travel.

Figure 11:
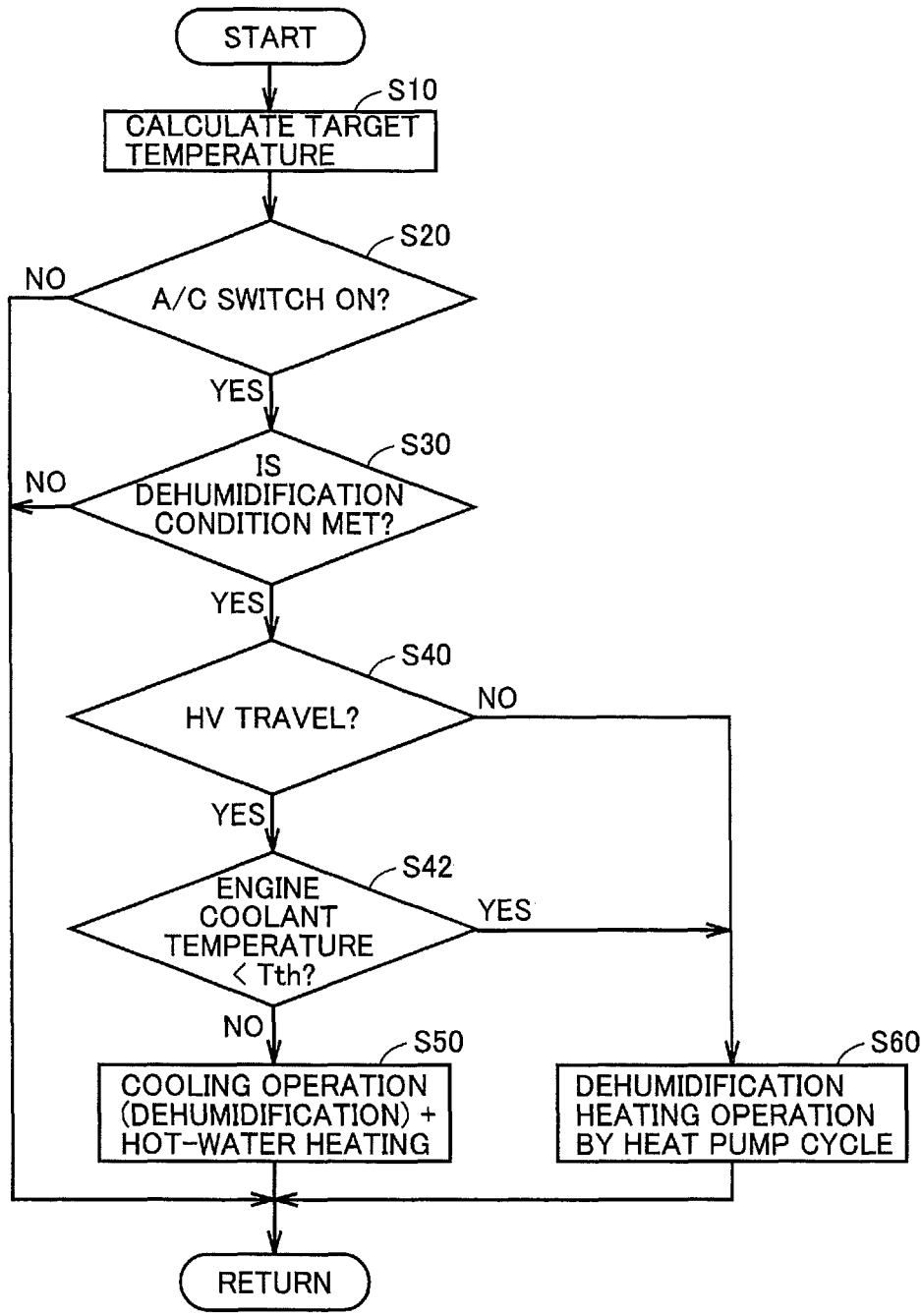
FIG. 11 is a flowchart for illustrating a process procedure of dehumidification heating control executed in a modification of the first embodiment.

FIG. 11 is a flowchart for illustrating a process procedure of the dehumidification heating control executed in a modification of the first embodiment. Referring to FIG. 11, this flowchart further includes step S42 in addition to the steps of the flowchart shown in FIG. 10. Namely, when it is determined in step S40 that the vehicle performs the HV travel (YES in step S40), ECU 30 determines whether or not the coolant temperature of engine 2 is lower than a criterion value Tth (step S42). This criterion value Tth is a value for determining whether or not the hot-water heating using engine 2 as a heat source can be used. Instead of the coolant temperature of engine 2, whether or not the temperature of engine 2 itself is lower than a predetermined criterion value may be determined.

When it is determined in step S42 that the engine coolant temperature is lower than the criterion value (YES in step S42), ECU 30 proceeds to step S60 and controls air conditioning facility 26 so that the heat pump cycle performs the dehumidification heating (first dehumidification heating). Namely, even while the HV travel is being done, the control, which is performed so that the second dehumidification heating is more preferentially performed during the HV travel than during the EV travel, is not performed in the case where the engine coolant temperature is lower than the criterion value.

In contrast, when it is determined in step S42 that the engine coolant temperature is equal to or higher than the criterion value (NO in step S42), ECU 30 proceeds to step S50 and controls air conditioning facility 26 so that the heat pump cycle performs the cooling operation (dehumidification) while the hot-water heating using engine 2 as a heat source is performed (second dehumidification heating).

As seen from the foregoing, the modification of the first embodiment does not more preferentially performs the second dehumidification heating when the engine coolant temperature is low, even if the vehicle is performing the HV travel. Reduction of the heating capacity of air conditioning facility 26 can thus be prevented.

Second Embodiment

Figure 12:
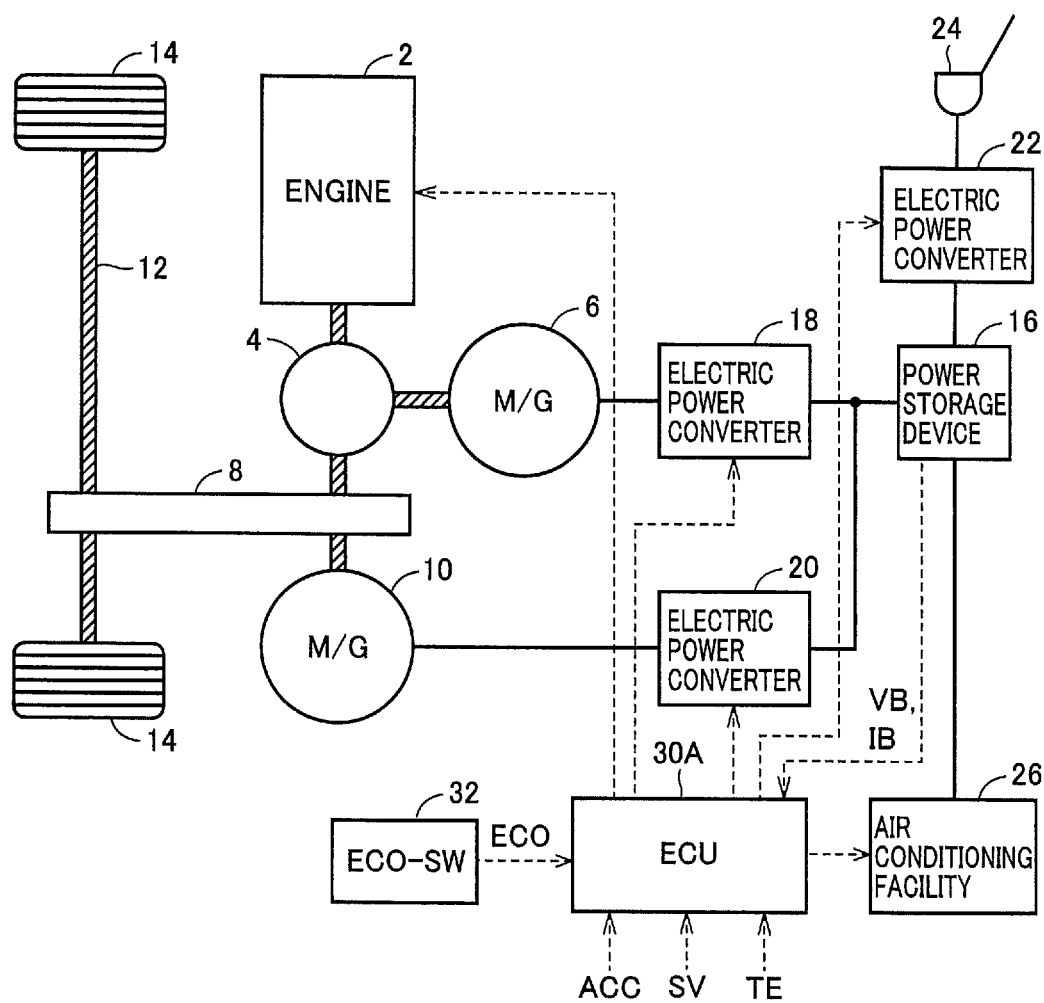
FIG. 12 is an overall block diagram of a hybrid vehicle according to a second embodiment.

FIG. 12 is an overall block diagram of a hybrid vehicle according to a second embodiment. Referring to FIG. 12, as compared with the components of hybrid vehicle 1 shown in FIG. 1, this hybrid vehicle 1A additionally includes an electric power converter 22, a connection unit 24, and an ECO mode switch 32, and includes an ECU 30A instead of ECU 30.

Electric power converter 22 converts electric power supplied from a power supply (not shown) located externally to the vehicle (the power supply will also be referred to as "external power supply" hereinafter) into a voltage level of power storage device 16, and outputs it to power storage device 16. Electric power converter 22 is formed for example of a rectifier or inverter.

Connection unit 24 is electrically connected to the external power supply and receives electric power supplied from the external power supply. The way to receive electric power from the external power supply is not limited to the contact power reception by means of connection unit 24, and may be non-contact reception of electric power from the external power supply by means of a power receiving coil or the like instead of connection unit 24.

ECO mode switch 32 is a switch which is operable by a driver. When ECO mode switch 32 is ON, the frequency of starting engine 2 is made lower than that when ECO mode switch 32 is OFF. How control is done when ECO mode switch 32 is operated will be described later herein in connection with a modification.

ECU 30A includes a CPU, a memory, and an input/output buffer for example, and performs control of each unit in hybrid vehicle 1A. ECU 30A executes, as one of main control functions, a travel control function of controlling travel of the vehicle by selectively applying a CD (Charge Depleting) mode where the SOC is consumed and a CS (Charge Sustaining) mode where the SOC is sustained.

Description of CD Mode/CS Mode

Figure 13:
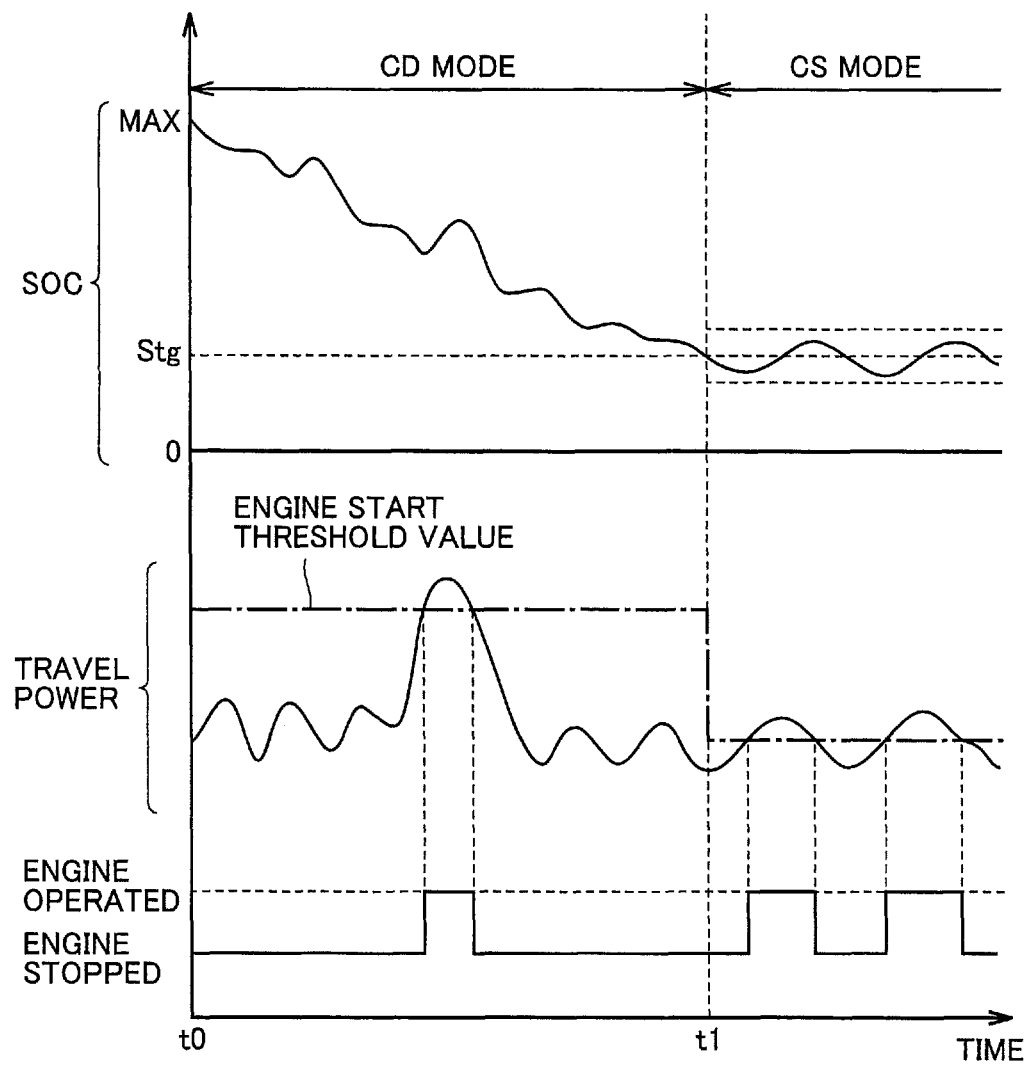
FIG. 13 is a diagram for illustrating a CD mode and a CS mode.

FIG. 13 is a diagram for illustrating the CD mode and the CS mode. Referring to FIG. 13, it is supposed that travel is started in the CD mode after power storage device 16 reaches a full state of charge (SOC=MAX) through charging of power storage device 16 by an external power supply (hereinafter also referred to as "external charging").

The CD mode is a mode where the SOC is consumed, and basically electric power stored in power storage device 16 (mainly electrical energy stored therein through external charging) is consumed. During travel in the CD mode, operation of engine 2 with the aim of maintaining the SOC is not done. Thus, although the SOC may temporarily be increased by regenerative electric power which is recovered while the vehicle is decelerated for example or electric power which is generated as engine 2 is operated, finally the power storage device has been discharged to a higher extent than the extent to which the power storage device has been charged. As a whole, the SOC decreases with an increase of the distance over which the vehicle travels.

The CS mode is a mode where the SOC is sustained within a predetermined range. By way of example, when the SOC has decreased at time t1 to predetermined value Stg which indicates a decrease of the SOC, the CS mode is selected and the subsequent SOC is sustained within a predetermined range. Specifically, in response to decrease of the SOC, engine 2 is operated and, in response to increase of the SOC, engine 2 is stopped. Namely, in the CS mode, operation of engine 2 with the aim of maintaining the SOC is done. Although not particularly shown, a switch which is operable by a driver may be provided so that the mode is switchable as intended by the driver regardless of decrease of the SOC.

In this hybrid vehicle 1A, when the travel power is smaller than a predetermined engine start threshold value, engine 2 is stopped and the vehicle is caused to travel by motor generator 10 (EV travel). In contrast, when the travel power becomes larger than the engine start threshold value, engine 2 is operated to cause the vehicle to travel (HV travel). During the HV travel, in addition to or instead of the drive force of motor generator 10, the drive force of engine 2 is used to cause hybrid vehicle 1 to travel. Electric power generated by motor generator 6 as engine 2 is operated is directly supplied to motor generator 10 or stored in power storage device 16.

Here, the engine start threshold value in the CD mode is larger than the engine start threshold value in the CS mode. Namely, the region for which hybrid vehicle 1A performs the EV travel in the CD mode is larger than the region for which hybrid vehicle 1A performs the EV travel in the CS mode. Accordingly, in the CD mode, the frequency of starting engine 2 is made lower. In contrast, in the CS mode, hybrid vehicle 1A is controlled so that it travels efficiently using both engine 2 and motor generator 10.

Even in the CD mode, engine 2 is operated when the travel power becomes larger than the engine start threshold value. It should be noted that, even when the travel power is not larger than the engine start threshold value, operation of engine 2 may be allowed in a case for example where the hot-water heating using engine 2 as a heat source is requested or engine 2 is warmed up. On the contrary, even in the CS mode, engine 2 may be stopped in response to increase of the SOC. In other words, the CD mode is not limited to the EV travel where the vehicle travels with engine 2 stopped all the time, and the CS mode is not limited as well to the HV travel where the vehicle travels with engine 2 operated all the time. In each of the CD mode and the CS mode, both the EV travel and the HV travel are possible.

Configuration of ECU 30A

Figure 14:
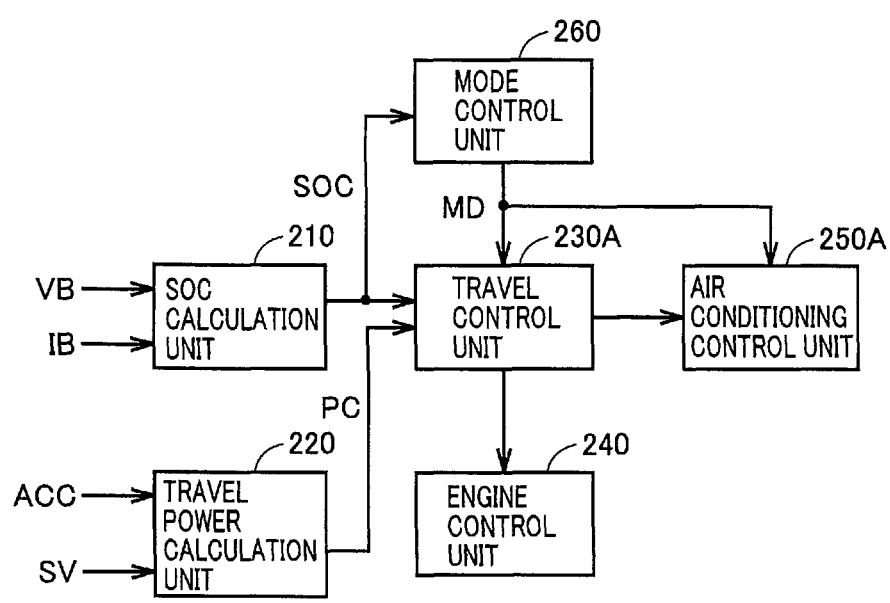
FIG. 14 is a functional block diagram of components, which are involved in air conditioning control, of an ECU shown in FIG. 12.

FIG. 14 is a functional block diagram of components, which are involved in air conditioning control, of ECU 30A shown in FIG. 12. Referring to FIG. 14, as compared with the components of ECU 30 in the first embodiment shown in FIG. 9, ECU 30A additionally includes a mode control unit 260 and includes a travel control unit 230A and an air conditioning control unit 250A instead of travel control unit 230 and air conditioning control unit 250, respectively.

Mode control unit 260 makes a mode selection, based on the SOC calculated by SOC calculation unit 210, namely selects one of application of the CD mode and application of the CS mode. Basically, upon completion of charging of power storage device 16 by an external power supply, mode control unit 260 selects the CD mode. Before the SOC decreases to predetermined value Stg (FIG. 13), mode control unit 260 maintains the CD mode. When the SOC decreases to predetermined value Stg, mode control unit 260 switches the CD mode to the CS mode. When a request to switch the mode is made through a switch which is operable by a driver, mode control unit 260 switches the mode as per the request, even if the SOC has not decreased to predetermined value Stg.

Travel control unit 230A sets a start threshold value of engine 2, based on mode signal MD received from mode control unit 260. As shown in FIG. 13, the engine start threshold value in the CD mode is set to a larger value than the engine start threshold value in the CS mode. Then, based on the SOC, travel control unit 230A calculates required charge/discharge power of power storage device 16. When the sum of travel power PC and the required charge/discharge power is equal to or less than the set engine start threshold value, travel control unit 230A controls the vehicle so that the vehicle performs the EV travel. When the aforementioned sum of powers becomes larger than the set engine start threshold value, travel control unit 230A controls the vehicle so that the vehicle performs the HV travel.

Air conditioning control unit 250A selects an operation mode of air conditioning facility 26 in accordance with a map as shown in FIG. 2, like air conditioning control unit 250 in the first embodiment.

Here, in the case where the dehumidification heating is selected as an air conditioning mode and mode control unit 260 selects the CD mode, air conditioning control unit 250A controls air conditioning facility 26 so that the heat pump cycle performs the dehumidification heating (first dehumidification heating). In contrast, in the case where the dehumidification heating is selected as an air conditioning mode and mode control unit 260 selects the CS mode, air conditioning control unit 250A controls air conditioning facility 26 so that the heat pump cycle performs the cooling operation (dehumidification) while the hot-water heating using engine 2 as a heat source is performed (second dehumidification heating). In the CS mode, engine 2 is repeatedly started/stopped as appropriate in order to sustain the SOC and thus the engine coolant temperature has been increased most of the time, and therefore, the second dehumidification heating is used. In contrast, in the CD mode, the frequency of operating engine 2 is lower than that in the CS mode and thus the engine coolant temperature has been decreased most of the time, and therefore, the dehumidification heating by means of the heat pump cycle is performed without using the hot-water heating apparatus which uses engine 2 as a heat source.

Figure 15:
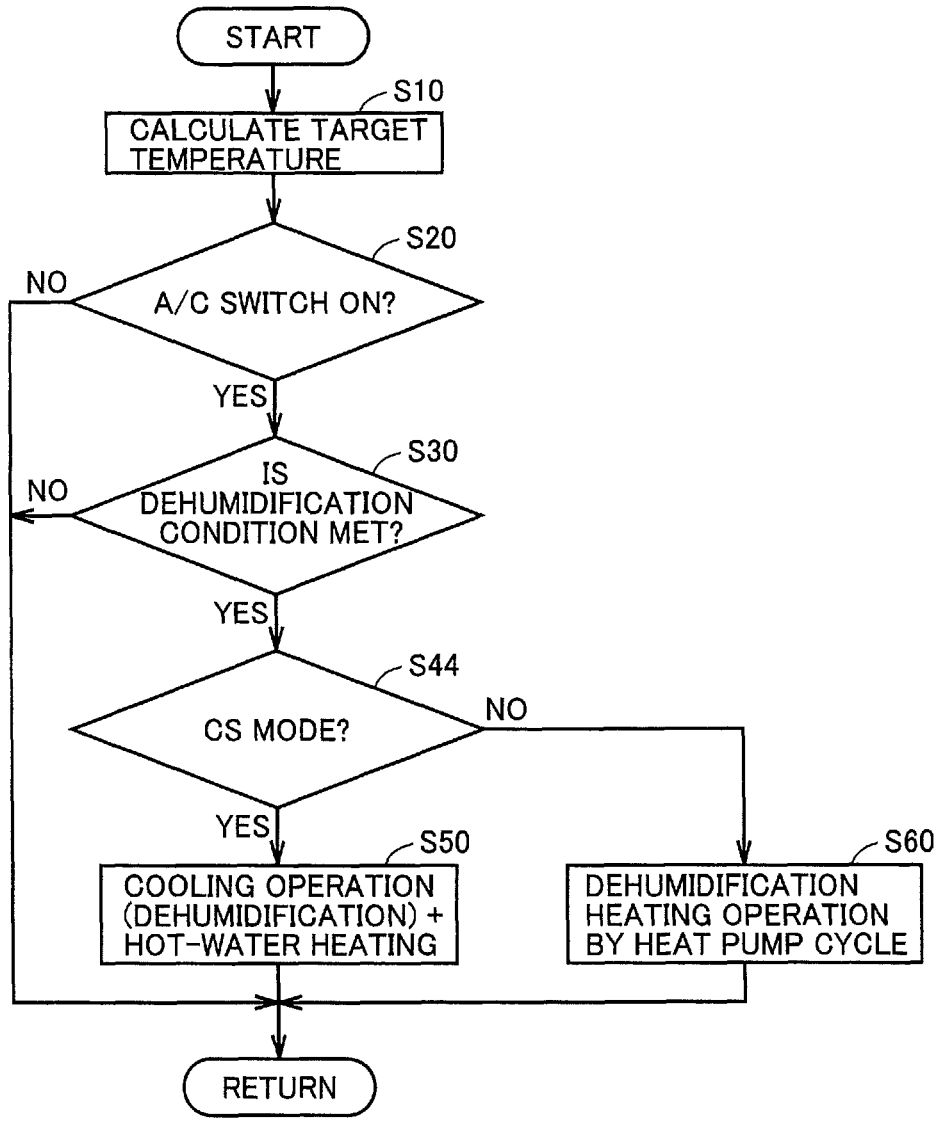
FIG. 15 is a flowchart for illustrating a process procedure of dehumidification heating control executed by the ECU.

FIG. 15 is a flowchart for illustrating a process procedure of the dehumidification heating control executed by ECU 30A. This flowchart is also implemented through execution at predetermined intervals of a program stored in advance in ECU 30A. Alternatively, for a part or the whole of the steps, dedicated hardware (electronic circuit) may be constructed to implement the processing.

Referring to FIG. 15, this flowchart includes step S44 instead of step S40 in the flowchart shown in FIG. 10. Namely, when it is determined in step S30 that the dehumidification condition is met (YES in step S30), ECU 30A determines whether or not the CS mode is selected (step S44). When the CS mode is selected (YES in step S44), ECU 30A proceeds to step S50 and controls air conditioning facility 26 so that the heat pump cycle performs the cooling operation (dehumidification) while the hot-water heating is performed using engine 2 as a heat source (second dehumidification heating).

In contrast, when it is determined in step S44 that the CD mode is selected (NO in step S44), ECU 30A proceeds to step S60 and controls air conditioning facility 26 so that the heat pump cycle performs the dehumidification heating (first dehumidification heating).

As seen from the foregoing, the second embodiment more preferentially performs the second dehumidification heating in the CS mode than in the CD mode in which the SOC is consumed. Accordingly, as compared with the case where the first dehumidification heating is applied all the time regardless of whether the mode is the CS mode or the CD mode, the power consumption can be reduced. In contrast, in the CD mode, the heating capacity can be ensured by the first dehumidification heating without operating engine 2. Thus, this hybrid vehicle 1A is also capable of executing the dehumidification heating control appropriate for the hybrid vehicle.

Modification of the Second Embodiment

In the above-described second embodiment, the dehumidification heating by means of the heat pump cycle (first dehumidification heating) is done in the CD mode. In the following modification, however, the first dehumidification heating is done as long as the ECO mode is selected in the CD mode.

Referring again to FIG. 12, when ECO mode switch 32 is ON, the frequency of starting engine 2 is made lower than that when the ECO mode switch 32 is OFF. This ECO mode can be implemented for example by reducing the travel power with respect to the extent to which the accelerator pedal is operated, as compared with the case where the ECO mode is not selected (normal mode).

During the first dehumidification heating, the power consumption of air conditioning facility 26 is larger than that during the dehumidification heating in which cooling operation (dehumidification)+hot-water heating is done (second dehumidification heating). In this modification, with the aim of executing the ECO mode by avoiding start of engine 2 due to insufficient hot-water heating capacity, the first dehumidification heating of large power consumption is performed on purpose in the ECO mode. When the CD mode is selected and the ECO mode is not selected, the second dehumidification heating is performed. This is done in order to reduce power consumption by using the hot-water heating and ensure an adequate travel distance in the CD mode, when the ECO mode is not selected.

Figure 16:
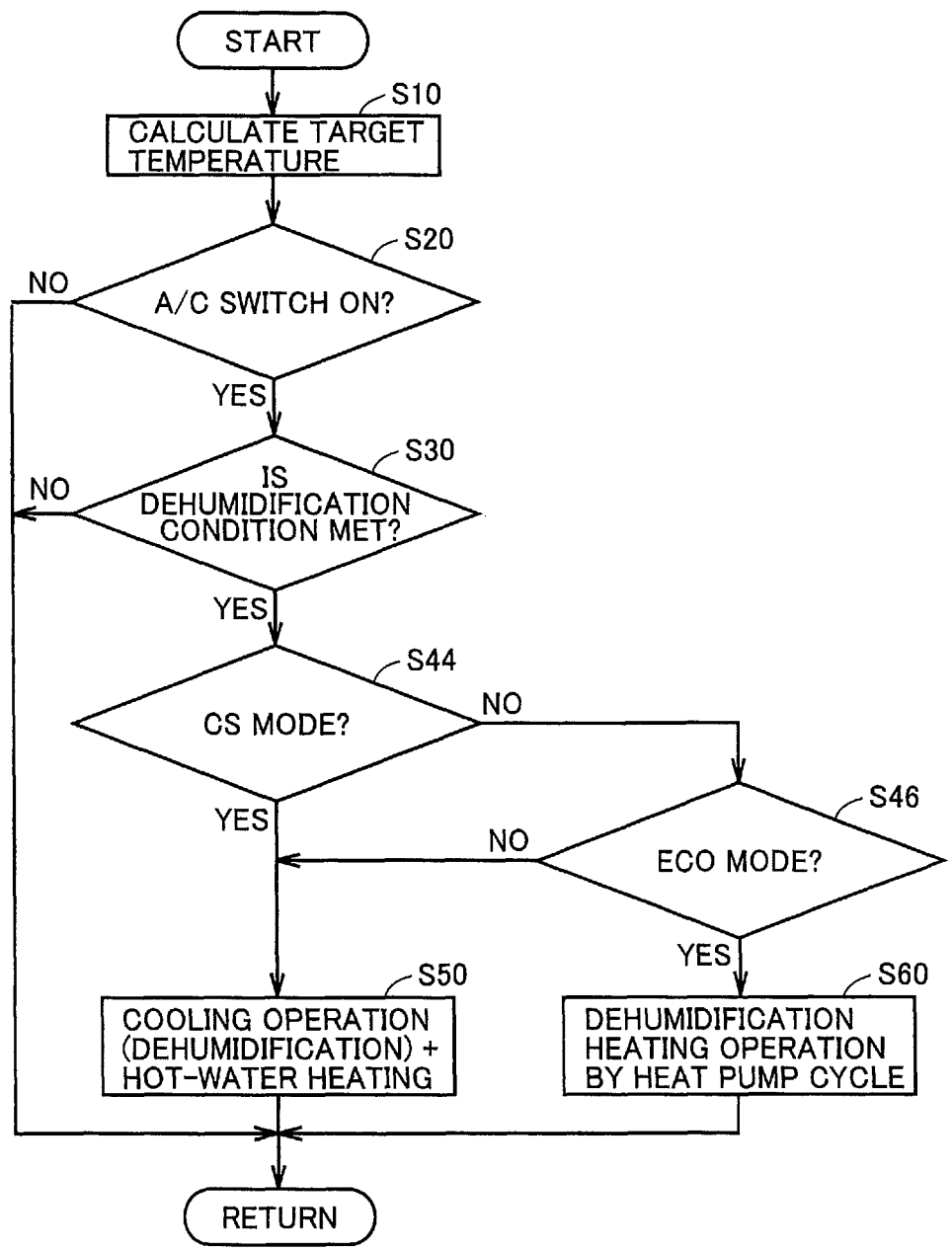
FIG. 16 is a flowchart for illustrating a process procedure of heating control executed by the ECU in a modification of the second embodiment.

FIG. 16 is a flowchart for illustrating a process procedure of heating control executed by ECU 30A in the modification of the second embodiment. Referring to FIG. 16, this flowchart further includes step S46 in addition to the steps of the flowchart shown in FIG. 15.

Specifically, when it is determined in step S44 that the CD mode is selected (NO in step S44), ECU 30A determines whether or not the ECO mode is selected by ECO mode switch 32 (FIG. 12) (step S46). When it is determined that the ECO mode is selected (YES in step S46), ECU 30A proceeds to step S60 and controls air conditioning facility 26 so that the heat pump cycle performs the dehumidification heating (first dehumidification heating). In contrast, when the ECO mode is not selected (NO in step S46), ECU 30A proceeds to step S50 and controls air conditioning facility 26 so that the heat pump cycle performs the cooling operation (dehumidification) while the hot-water heating is performed (second dehumidification heating).

As seen from the foregoing, according to the modification of the second embodiment, the first dehumidification heating is performed when the ECO mode is selected in the CD mode, to thereby enable the ECO mode to be executed by avoiding start of engine 2 due to insufficient heating capacity, although the power consumption of air conditioning facility 26 is increased. In contrast, when the ECO mode is not selected in the CD mode, the second dehumidification heating is performed, to thereby enable the power consumption to be reduced and an adequate travel distance in the CD mode to be ensured.

While the second embodiment and its modification have been described in which hybrid vehicle 1A is a hybrid vehicle for which external charging is possible, the invention described in connection with the second embodiment and its modification is also applicable to hybrid vehicles having no external charging capability. While the CD mode/CS mode is appropriate for the hybrid vehicle for which external charging is possible, the CD mode/CS mode is not necessarily applied only to the hybrid vehicle for which external charging is possible.

Further, while the above description of each embodiment and each modification has been given regarding a series/parallel-type hybrid vehicle in which power split device 4 can split the drive force of engine 2 and transmit the drive force to driveshaft 12 and to motor generator 6, the present invention is also applicable to hybrid vehicles of other types. For example, the present invention is also applicable to vehicles such as a so-called series-type hybrid vehicle in which engine 2 is used solely for driving motor generator 6 and only motor generator 10 generates the drive force for the vehicle, a hybrid vehicle in which only the regenerative energy of the kinetic energy generated by engine 2 is recovered as electrical energy, and a hybrid vehicle of motor-assisted type in which the engine is used as a main power source which is assisted by a motor as required. The present invention is also applicable to a hybrid vehicle which is caused to travel by motive power of only the engine with the motor disconnected.

In the foregoing, engine 2 corresponds to an embodiment of "internal combustion engine" of the present invention and motor generator 10 corresponds to an embodiment of "electric motor" of the present invention. Further, ECU 30, 30A corresponds to an embodiment of "control apparatus" of the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A hybrid vehicle comprising:
    an internal combustion engine;
    a power storage device storing electric power generated using an output of the internal combustion engine;
    an electric motor generating a vehicle drive force using the electric power stored in the power storage device;
    an air conditioning facility configured to:
        heat while dehumidifying a vehicle interior;
        selectively perform a first dehumidification heating and a second dehumidification heating, the first dehumidification heating being performed for conducting dehumidification and heating using the electric power stored in the power storage device, the second dehumidification heating being performed for conducting heating using the internal combustion engine as a heat source while conducting dehumidification using the electric power stored in the power storage device;
    an ECO mode switch that is operable by an occupant of the vehicle to select an ECO mode; and
    a control apparatus programmed to:
        select between a CD (Charge Depleting) mode for consuming an SOC of the power storage device and a CS (Charge Sustaining) mode for sustaining the SOC;
        control travel of the vehicle by selectively applying the CD mode and the CS mode;
        control the air conditioning facility to perform the second dehumidification heating when the CS mode is selected by the control apparatus;
        control the air conditioning facility to perform the second dehumidification heating when the CD mode is selected by the control apparatus and the ECO mode is not selected by the occupant;
        control travel of the vehicle by applying the ECO mode for reducing a frequency of starting the internal combustion engine; and
        control the air conditioning facility so that the air conditioning facility performs the first dehumidification heating when the CD mode is selected and the ECO mode is selected.

2. The hybrid vehicle according to claim 1, wherein the air conditioning facility includes:
    a heat pump cycle having an electric compressor, an indoor condenser, a first expansion valve, an outdoor heat exchanger, a second expansion valve, and an evaporator; and
    a hot-water heating apparatus heating a vehicle interior using the internal combustion engine as a heat source and using a coolant for the internal combustion engine;
    the air conditioning facility performs the first dehumidification heating by conducting heating using the indoor condenser while conducting dehumidification using the evaporator; and
    the air conditioning facility performs the second dehumidification heating by conducting heating using the hot-water heating apparatus while conducting dehumidification using the evaporator.

* * * * *